March 17, 1953     N. E. WAHLBERG     2,631,707

TRANSMISSION SHIFTING MEANS

Filed Jan. 24, 1947     2 SHEETS—SHEET 1

NILS ERIK WAHLBERG
INVENTOR.

BY Carl J. Barbee

HIS ATTORNEY

March 17, 1953 N. E. WAHLBERG 2,631,707
TRANSMISSION SHIFTING MEANS
Filed Jan. 24, 1947 2 SHEETS—SHEET 2

NILS ERIK WAHLBERG
INVENTOR.

BY Carl J Barbee

HIS ATTORNEY

Patented Mar. 17, 1953

2,631,707

UNITED STATES PATENT OFFICE 2,631,707

TRANSMISSION SHIFTING MEANS

Nils Erik Wahlberg, Chicago, Ill., assignor to Nash-Kelvinator Corporation, Kenosha, Wis., a corporation of Maryland Application January 24, 1947, Serial No. 723,998

3 Claims. (Cl. 192—98)

This invention relates to improvements in transmission gears and more particularly to improvements in means for operating a speed clutch synchronizer for power transmissions of motor vehicles.

It is an object of this invention to provide means for operating a synchronizer for a power transmission which will apply energy equally on opposite sides of the clutch collar of said synchronizer.

It is a further object of this invention to provide means for operating a synchronizer for a power transmission which will require a minimum of effort to operate said synchronizer.

It is another object of this invention to provide means for operating a synchronizer for a power transmission which will be economical in its manufacture, simple in its use, and which will require little revision of the parts of the ordinary automotive transmission.

Further objects and advantages of this invention will be apparent from a consideration of the following description, claims and the attached drawings of which there are two sheets wherein like reference characters are used to designate like parts, and in which:

Figure 1:
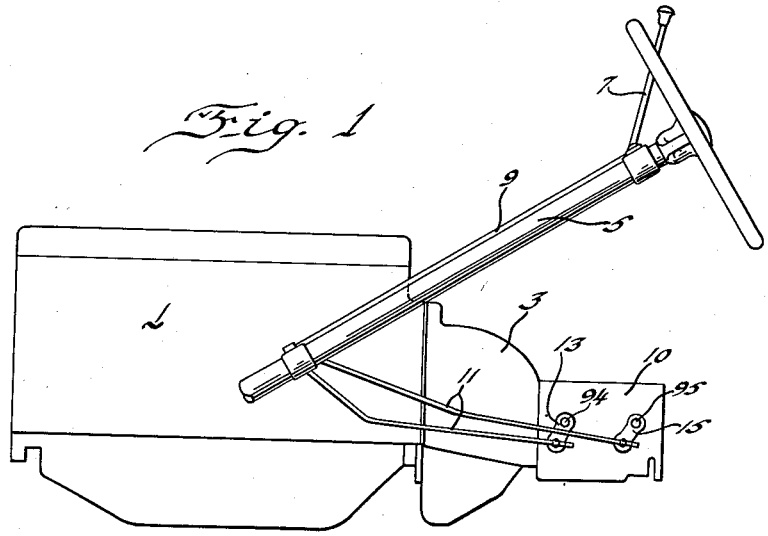
Figure 1 is a side elevational view of a motor vehicle engine with associated clutch and transmission means and showing shifting means for said transmission.

In Figure 1 is shown an internal combustion engine 1 with the associated clutch 3 and transmission. The usual shifting means for the transmission is comprised of a shift lever 7 and shift shaft 9 carried by steering column 5. Shifting rods 11 operably connect shaft 9 and levers 13 and 15 which are associated with the transmission.

Figure 2:
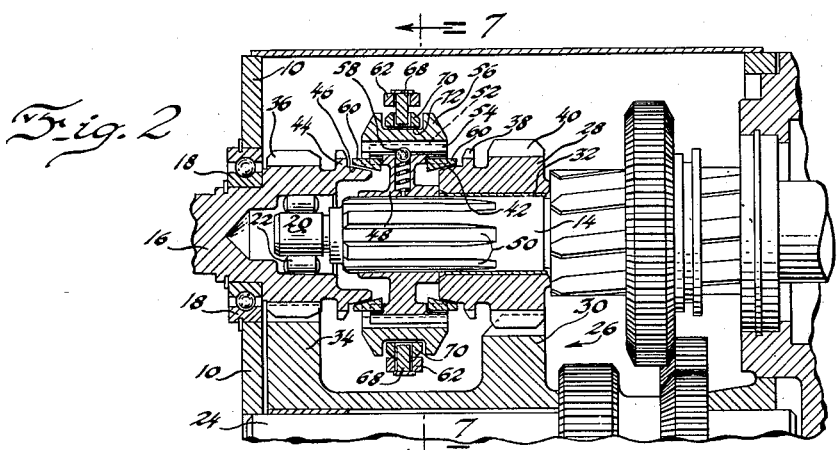
Figure 2 is a side elevational view, partially in section, of a portion of a power transmission for an automobile.
Figure 7:
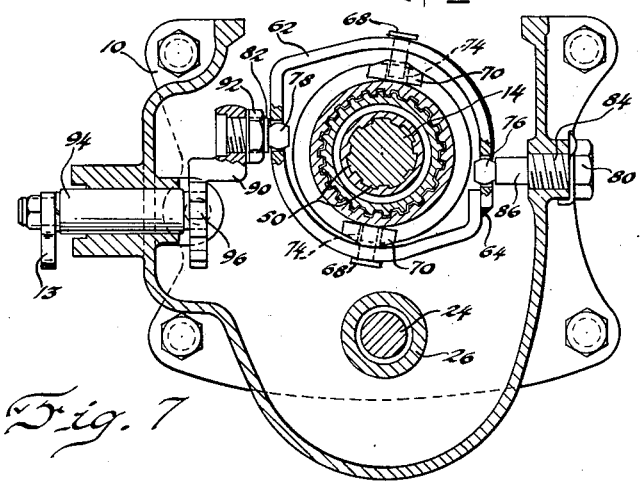
Figure 7 is a view taken along lines 7—7 of Figure 2 looking in the direction of the arrows.

In Figure 2 is shown an automotive transmission enclosed within a casing 10 and comprising a main shaft 14 journaled within a ball bearing (not shown) in the rear wall of casing 10 and a clutch shaft 16 journaled in a ball bearing 18 secured within the forward wall of casing 10. The forward end 20 of main shaft 14 is journaled within roller bearings 22 which are positioned within a hole formed in the rear end of clutch shaft 16. A countershaft 24 has its forward and rearward ends secured in apertures in the walls of casing 10 and is positioned parallel to main shaft 14 and clutch shaft 16. The usual countershaft gear cluster indicated generally at 26 is telescopically positioned on countershaft 24 and rotatably carried thereby.

Gear 28 is telescopically positioned on main shaft 14 and rotatable thereon and is in constant engagement with gear 30 of countershaft gear cluster 26. The most forward gear 34 of countershaft gear cluster 26 is in constant engagement with gear 36 formed on clutch shaft 16 within transmission casing 10.

Intermediate clutch gear 38 is formed on the forward side of gear 28 intermediate the gear teeth 40 and clutching surface 42 formed on the most forward portion of gear 28.

Clutch gear 44 which is similar to clutch gear 38 is formed on clutch shaft 16 between gear 36 and clutch surface 46 formed on the most rearward portion of clutch shaft 16 and which is similar to clutch surface 42.

The transmission within casing 10 is provided with a jaw clutch synchronizer comprised of an interially splined hub 48 which is telescopically positioned upon and in driving engagement with splined portion 50 of main shaft 14. Hub 48 is slideable on portion 50 of shaft 14. The outer periphery of hub 48 is defined by a series of gear teeth 52 which are in constant engagement with the internal gear teeth 54 of collar 56 which is telescopically positioned around hub 48. Collar 56 is designed to be moved forwardly and rearwardly of hub 48 to move gear teeth 54 into direct engagement with jaw clutches 44 and 38 respectively.

Hub 48 is provided with a series of spring pressed balls 58 which are positioned to engage grooves formed in the inner edges of gear teeth 54 opposite said balls 58. Movement of collar 56 independently of hub 48 is in this manner resisted as balls 58 must be moved out of the grooves in gear teeth 54 before collar 56 will move independently of hub 48. Further, hub 48 is provided with a pair of friction cones 60 each drivingly secured to hub 48, one on its forward side and one on its rearward side adjacent the friction surfaces 46 and 42.

When collar 56 is moved forwardly to engage gear teeth 54 with jaw clutch 44, hub 48 will be moved forwardly due to the engagement of balls 58 with the grooves in gear teeth 54 and thus the friction cone 60 adjacent friction surface 43 will be moved into engagement therewith which will tend to synchronize the speeds of jaw clutch 44 and gear teeth 54. In a like manner, the cone 60 adjacent friction surface 42 will be moved into engagement therewith when collar 56 is moved rearwardly to directly engage gear teeth 54 with jaw clutch 38 and thus the speeds of rotation of gear teeth 54 and jaw clutch 38 will be synchronized.

It has been a common practice in the use of automotive transmissions to shift a collar such as collar 56 by manipulating a manually movable fork-like shifter in engagement with collar 56. It has been found that by the use of such a fork all of the energy used to shift the collar 56 is applied to one side thereof thus tending to cock the collar on the hub such as hub 48. This, of course, tends to make the collar such as collar 56 slide with more difficulty on the hub such as hub 48 and tends to cock the hub on the shaft it is carried by.

This invention provides means whereby an equal amount of energy will be applied to collar 56 on opposite sides thereof. This means comprises a substantially cylindrical ring or collar-like member 62 encircling collar 56 and associated means described hereinafter.

Figure 4:
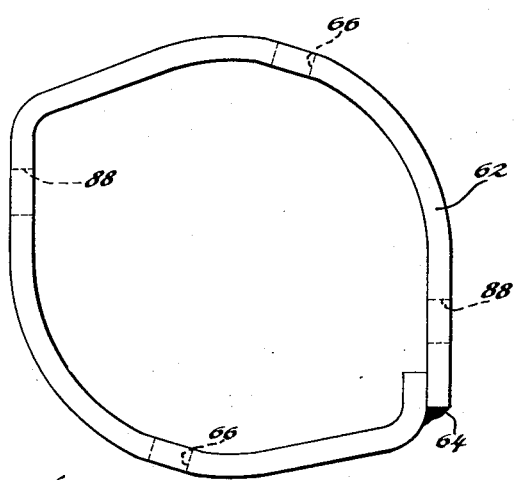
Figure 4 is an end view of the shifter collar of the invention.
Figure 5:
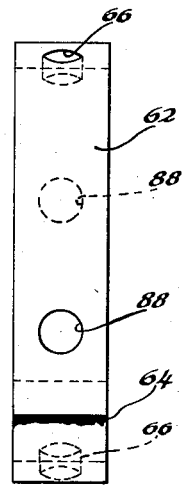
Figure 5 is a side elevational view of the shifter collar shown in Figure 4.
Figure 6:
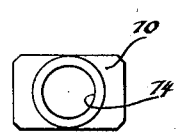
Figure 6 is a plan view of one of the shifter shoes of the invention.

Member 62 is a stamping of sheet steel having its ends welded together as at 64 (Figures 2 and 4) and is provided with a pair of aligned apertures 66 in which are secured inwardly extending pins 68. Telescopically positioned around the inner ends of pins 68 are shifting shoes 70 which are positioned within groove 72 formed in the outer periphery of collar 56. Shoes 70 are provided with apertures 74 extending therethrough in which are positioned the inner ends of pins 68. Apertures 74 are of a slightly greater diameter than the diameter of pins 68 so as to provide loose fit therebetween. The width of shoes 70 is slightly less than the width of groove 72 of collar 56 so that collar 56 is freely rotatable independently of the shoes 70. To further facilitate movement of collar 56 independently of shoes 70, the thickness of shoes 70 is slightly less than the distance from the inner periphery of member 62 and the outer periphery of collar 56 within groove 72.

Member 62 is provided with a pair of horizontal apertures 88 in which are positioned the inner ball ends 76 and 78 of bolts 80 and 82, respectively. Bolt 80 has a threaded portion 84 which is turned into engagement with a threaded aperture in casing 10 and has a reduced portion 86 which extends into casing 10 from threaded portion 84 to ball 76. Portion 86 is a slightly greater diameter than the diameter of apertures 88 in which is positioned ball 76.

The outer periphery of bolt 82 is threaded and turned into engagement with the threaded aperture in the upper end of rock arm 90. A nut 92 is turned on bolt 82 to rigidly secure said bolt in arm 90. The diameter of bolt 82 is slightly greater than the diameter of aperture 88 associated with ball 78. Arm 90 is carried by rock shaft 94 which extends through the outer wall of casing 10 to its inner reduced end 96 which is rigidly secured within an aperture in the lower end of arm 90. Rock shaft 94 is manually rotatable to rotate arm 90 which moves ball 78 forwardly or backwardly, depending on the direction of rotation, in regard to collar 56.

Figure 3:
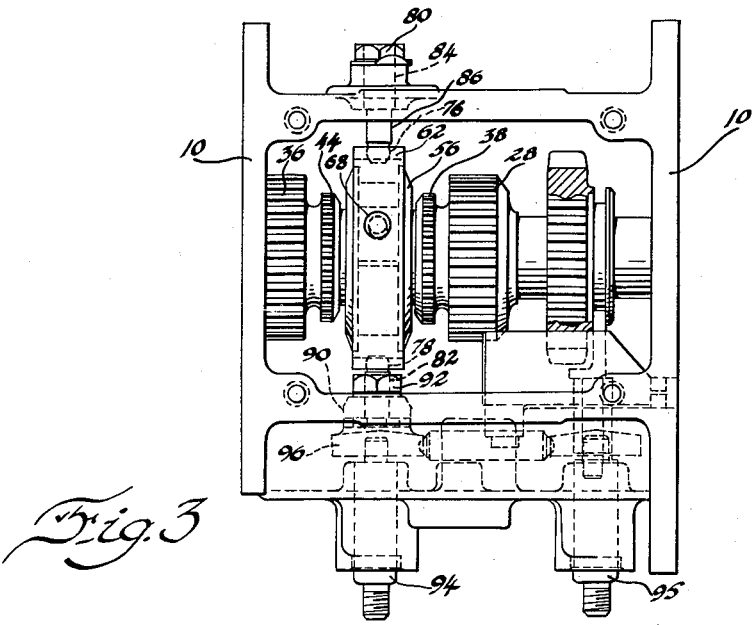
Figure 3 is a plan view of a power transmission for an automobile showing the invention incorporated therein.

If rock shaft 94, as shown in Figure 3, is rotated in a counter-clockwise direction, ball member 78 will be moved forwardly, thus moving member 62 in a like direction pivoting same around the center of ball 76 which will move shoes 70 forwardly, thus moving collar 56 toward engagement with jaw clutch 44. If rock shaft 94 is rotated in a clockwise direction, ball 78, member 62, shoes 70, and collar 56 will be moved rearwardly to facilitate the engagement of collar 56 with jaw clutch 38.

It will be noted that the plane defined by the centers of pins 68 intersects the plane in which the centers of balls 76 and 78 lie at right angles and said planes intersect at the center of shaft 14; thus, when shifting energy is transmitted through ball 78 to member 62 and thence to shoes 70, equal pressure will be applied on opposite sides of collar 56 adjacent shoes 70 for movement thereof and thus the danger of cocking collar 56 on hub 48 due to unbalanced shifting energy being applied to sail collar is omitted.

In the manner described above I have provided improvements in means for operating speed clutch synchronizers for power transmissions.

While I have described my invention in some detail, this is not intended to be considered a limitation on my invention but an example only to which I make the following claims:

1. In a power transmission, a transmission case, a driven member within said case, a shifting collar telescopically positioned around said driven member, a shifting member having opposed apertures therein, a ball member carried by said case and positioned within one of said apertures, a second ball member positioned within said second aperture, shiftable means carried by said case for supporting said second ball member, and connection means extending between said shifting collar and said driven member for transmitting shifting movement thereto.

2. In a power transmission, a shiftable driven means, a shifting collar for said driven means telescopically positioned therearound, a transmission case enclosing said driven means, a ball member carried by said casing on one side of said driven means, a movable ball member carried by said casing on the opposite side of said driven means from said first ball member, said shifting collar having an aperture in which is positioned said first ball means, said collar having a second aperture in which said second ball is positioned, and a pair of connection means between said collar and said driven means opposite from each other and having centers lying in a plane which intersects substantially at right angles the plane in which the centers of the ball members lie.

3. In a power transmission, a driven means, a tranmission casing enclosing said driven means, a shifting collar telescopically positioned around said driven means, said shifting collar having a pair of apertures on opposite sides thereof, a first ball member supported by said casing and positioned within one of said apertures, a second movable ball member carried by said casing and positioned within the other of said apertures, and a pair of connection means extending between said collar and said driven means on opposite sides thereof having their centers lying in the plane which intersects the plane in which the centers of the ball members lie at substantially right angles and at the center of the driven member.

NILS ERIK WAHLBERG.

REFERENCES CITED

The following references are of record in the file of this patent:

UNITED STATES PATENTS

| Number | Name | Date |
|---|---|---|
| 671,602 | Levalley | Apr. 9, 1901 |
| 1,270,721 | Gibson | June 25, 1918 |
| 1,282,808 | Gibson | Oct. 29, 1918 |
| 1,345,357 | Mason | June 29, 1920 |
| 1,606,127 | Kolb | Nov. 9, 1926 |
| 1,956,315 | Collins | Apr. 24, 1934 |
| 2,046,957 | Manville | July 7, 1936 |
| 2,389,490 | Dugas | Nov. 20, 1945 |